United States Patent [19]

Nakao et al.

[11] Patent Number: 5,315,395
[45] Date of Patent: May 24, 1994

[54] PROJECTOR WITH SEPARABLE PROJECTION UNIT AND DISPLAY BODY

[76] Inventors: Mitsuya Nakao, 25-5, Fujigaoka-3-chome, Fujisawa-shi; Keiichiro Tanaka, 1-3-304, Ryoke-4-chome, Izumi-ku, Yokohama-shi; Kousyu Ichikawa, 9-3, Nagatadai, Minami-ku, Yokohama-shi; Akio Yamamoto, 467-8, Nakatacho, Izumi-ku, Yokohama-shi; Tadakazu Matsubara, 8-11, Honfujisawa-2-chome, Fujisawa-shi, all of Japan

[21] Appl. No.: 972,837

[22] Filed: Nov. 6, 1992

[30] Foreign Application Priority Data

May 8, 1991 [JP] Japan .................. 3-102468
Dec. 13, 1991 [JP] Japan .................. 3-330344

[51] Int. Cl.⁵ .............................................. H04N 5/74
[52] U.S. Cl. ................................... 348/789; 348/744
[58] Field of Search ............... 358/231, 237, 60, 254; 353/119; H04N 5/74

[56] References Cited

U.S. PATENT DOCUMENTS 4,755,881  7/1988  Bartlett ........................... 358/254

Primary Examiner—Mark R. Powell
Attorney, Agent, or Firm—Antonelli, Terry, Stout & Kraus

[57] ABSTRACT

A projection-type display device comprises: a display body including an upper cabinet having a screen at a front portion thereof and a lower cabinet having a pair of side frames for supporting the upper cabinet; a projector unit including projectors and mounting device on which the projectors are mounted movable in the forward/backward directions with respect to the lower cabinet; guide device for guiding the projector unit to a predetermined position in the display body when the projector unit is separated from or received into the display body; locating device for locating the projector unit at a predetermined position and securing together the projector unit and the display body to separate one of them from the floor surface; and a device for supporting the other of the projector unit and the display body is grounded on the floor surface, at three positions.

6 Claims, 8 Drawing Sheets

PROJECTOR WITH SEPARABLE PROJECTION UNIT AND DISPLAY BODY

BACKGROUND OF THE INVENTION

The present invention relates to a projection-type display device, and more particularly to a projection-type display device in which a display body having a screen and a projector unit having a projector are mutually separable.

There is a type of projection-type display device in which a display body having a screen and a projector unit having a projector are separable from each other for purposes of repair and maintenance.

In such a projection-type display device, the projector unit has casters provided at the lower part. However, this device has a disadvantage that the projector unit cannot be easily handled when separated from or received into the display body due to its large weight. In particular, the projector unit tends to collide with a lower cabinet of the display body when being received thereinto, thereby damaging the lower cabinet.

When the projector unit is separated from the display body and thereafter received into the display body, it is difficult to exactly locate the projector unit at the same position as it was prior to separation. Therefore, there would sometimes arise a undesirable change in the optical relationship between the projector unit and the display body. As a result, an image projected on the screen is deteriorated. Also, when the projection-type display device is moved to another place, the optical relationship between the projector unit and the display body would likewise change due to the difference in the floor state of the respective installing locations of the display body and the projector unit, so that an image projected on the screen is deteriorated. In such cases, the optical relationship should be readjusted. Adjusting the optical relationship requires quite delicate operations and a number of man-hours.

Further, although the projector unit must be inclined upon repairing and maintenance, this cannot easily be done because of the significant weight of the projector unit as mentioned hereinbefore. Therefore, it sometimes occurs that the casters provided at the lower part of the projector unit undesirably slide, damaging the flor surface or people when the projector unit is inclined.

It is therefore a first object of the present invention to provide a projection-type display device which is capable of easily separating the projector unit from the display body and which does not suffer optical change between the display body and the projector unit when both are mutually separated or when the projection-type display device is moved to another place.

It is a second object of the present invention to provide a projection-type display device which is capable of preventing the projector unit from skidding when being laid down so as not to injure or damage workers or the floor.

SUMMARY OF THE INVENTION

A projection-type display device according to the present invention comprises: a display body including an upper cabinet having a screen at the front portion thereof and a lower cabinet having a pair of side frames for supporting the upper cabinet; a projector unit including projectors and a mounting device on which the projectors are mounted movable in the forward/backward direction with respect to the lower cabinet; guide means for guiding the projector unit to a predetermined position in the display body when the projector unit is received into or separated from the display body; means for locating the projector unit at a predetermined position and securing together the projector unit and the display body to separate one of them from the floor surface; and means for supporting the other of the projector unit and the display body which is grounded on the floor surface at three portions.

In a first embodiment of the projection-type display device according to the present invention, the guide means comprises a pair of plate-like guide rails extending in the forward/backward direction on the lower cabinet of the display body and having a tapered forward portion; a plurality of rollers rotatable on the plate-like guide rails and mounted on the projector unit at a level where the projector unit is separated from the floor surface when the rollers rotate on the plate-like guide rails; brackets protruding laterally from the projector unit and having flanges for guiding the projector unit by engaging with outer side surfaces of the plate-like guide rails; and the locating means comprises through holes formed at predetermined positions on the brackets, screw holes formed at predetermined positions on the guide rails, and bolts to be passed through the through holes to be screwed into the screw holes.

In a second embodiment of the projection-type display device according to the present invention, the guide means comprises: a pair of ball groups arranged in the forward/backward direction and rotatably supported on the lower cabinet of the display body through perforated plate members; and brackets laterally extending from the projector unit and having flanges formed at outer edges for guiding the projector unit by engaging with outer surfaces of the plate members; and the locating means comprises through holes formed at predetermined positions on the brackets, screw holes formed at predetermined positions on the perforated plate members, and bolts to be passed through the through holes to be screwed into the screw holes.

In a third embodiment of the projection-type display device according to the present invention, the guide means comprises: a pair of flanged guide rails mounted on the lower cabinet of the display body, extending in the forward/backward direction, each of the guide rails having a front portion sloped in the direction of thickness and being widened toward a front end; and a plurality of rollers guided by the flanges of the flanged guide rails to rotate thereon, the rollers being rotatably installed on the projector unit at a height level where the projector unit is separated from the floor surface when the rollers rotate on the flanged guide rails; and the locating means comprises through holes formed at predetermined positions on the brackets extending laterally from the projector unit, screw holes formed at predetermined positions on the flanged guide rails, and bolts to be passed through the through holes to be screwed into the screw holes.

In a fourth embodiment of the projection-type display device according to the present invention, the guide means comprises: a pair of guide rails mounted on the lower cabinet of the display body, extending in the forward/backward direction and brackets extending laterally from the projector unit and having flanges formed at outer edges for guiding the projector unit by engaging with outer side surfaces of the guide rails; and the locating means comprises through holes formed at predetermined positions on the brackets, screw holes formed at predetermined positions on the guide rails, and bolts to be passed through the through holes to be screwed into the screw holes; whereby the display body is separated from the floor surface when the display body and the projector unit are joint together.

The projector unit preferably comprises means for preventing skid disposed at a fulcrum position for the projector unit when it is laid down and stood up.

Since the projection-type display device according to the invention comprises the guide means for guiding the projector unit to a predetermined position in the display body when the projector unit is received into the display body, it is possible to locate the projector unit in the predetermined position with respect to the display body without the projector unit being come into collision with the display body.

Further, the projection-type display device according to the present invention comprises the locating means for locating the projector unit at the predetermined position, securing together the projector unit with the display body, and separating one of them from the floor surface. Therefore, when the projector unit and the display body are joined together, the optical relationship between them will be necessarily determined. As a result, it becomes unnecessary to readjust the optical relationship therebetween when the projector unit is separated/received from/into the display body.

Furthermore, one of the projector unit and the display body which is grounded on the floor is supported at three points, so the projection-type display device do not receive any influence from change of floor surface state even when moved to another place and not to require the readjustment of the optical relationship therebetween.

DESCRIPTION OF THE PREFERRED EMBODIMENTS

Figure 1:
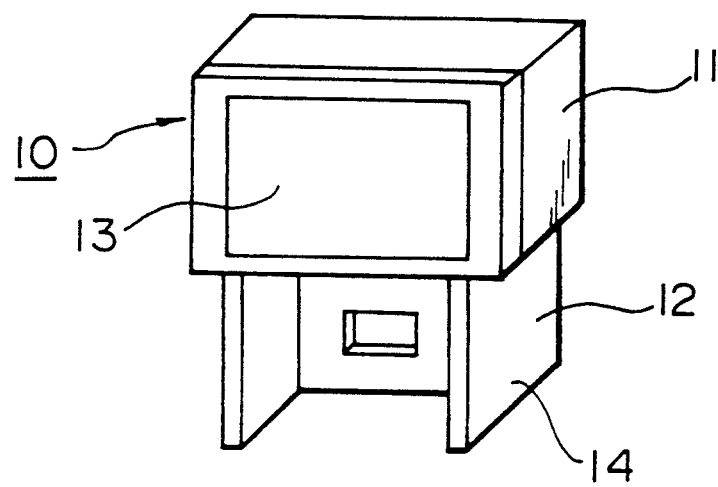
FIG. 1 is a schematic perspective view of a conventional projection-type display device in which a display body having a screen and a projector unit having a projector are mutually separable.
Figure 1:
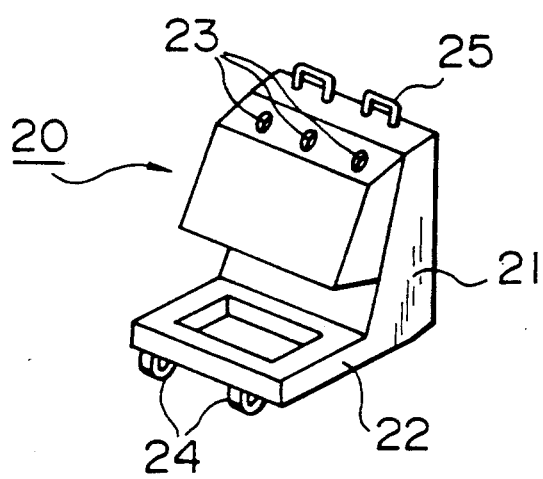

A first embodiment of the projection-type display device according to the present invention will now be described with reference to FIG. 1 and FIGS. 2 through 5. The projection-type display device in the form of a cabinet comprises a display body 10 and a projector unit 20. The display body 10 includes an upper cabinet 11 and a lower cabinet 12, and a screen 13 is secured to the upper cabinet 11. The lower cabinet 12 has a pair of side frames 14, between which the projector unit 20 is removably received.

The projector unit 20 includes a mounting device 21 and a projector 23 mounted thereon. The mounting device 21 includes a chassis 22 and casters provided at the lower portion of the chassis 22 so as to be movable. The chassis 22 has handles 25 used when the projector unit 20 is moved.

Figure 2:
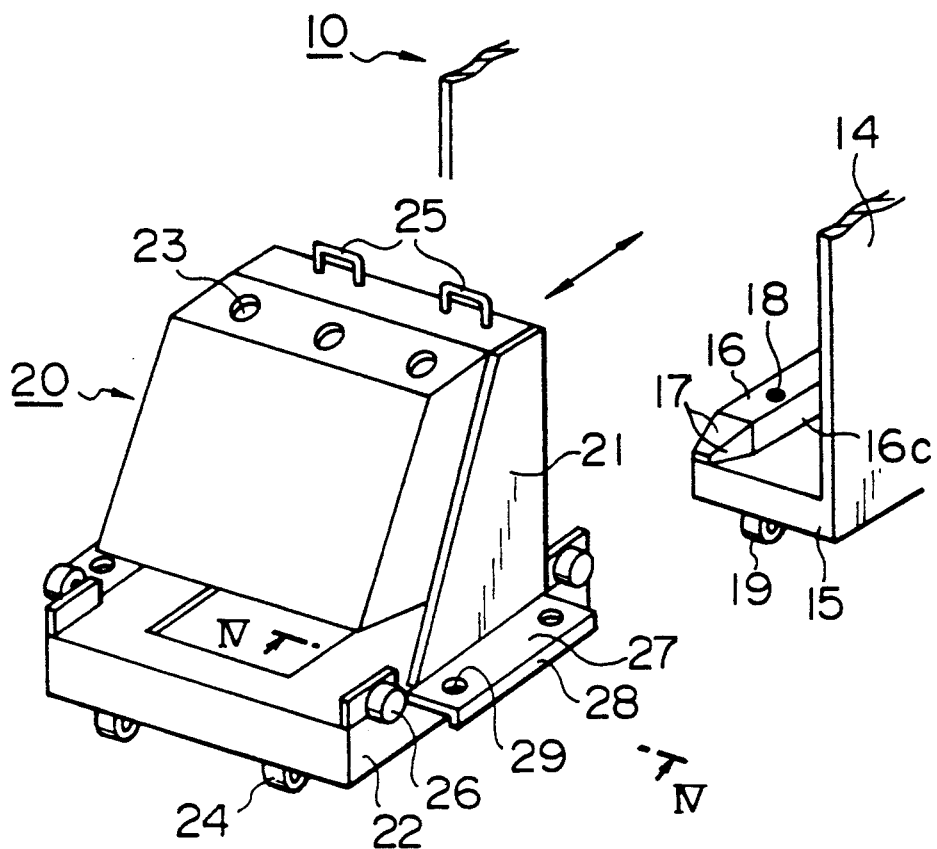
FIG. 2 is a schematic perspective view of a first embodiment of a projection-type display device according to the present invention.
Figure 3:
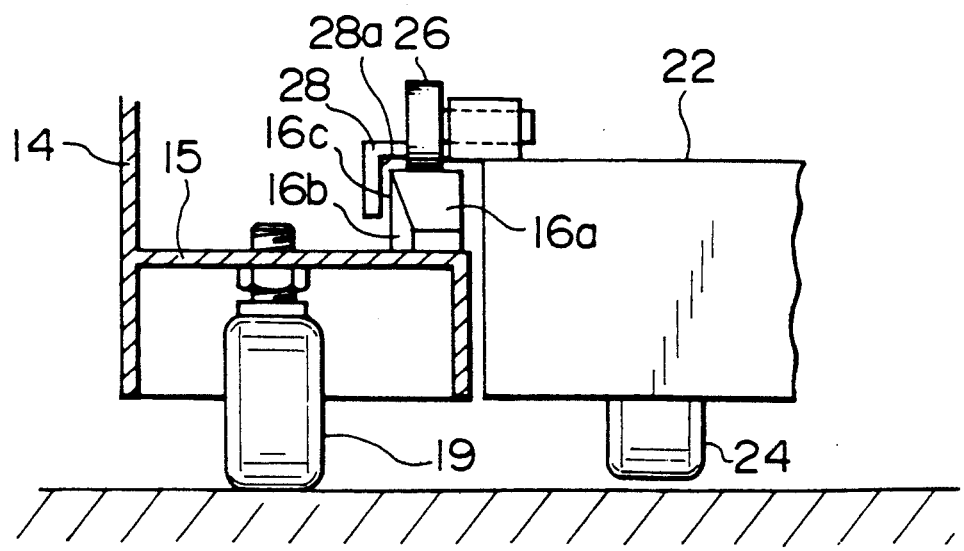
FIG. 3 is a partial front view of the first embodiment of the present invention.

As shown in FIG. 2, the chassis 22 of the mounting device 21 has rollers 26 extending laterally at its four corners, which are mounted rotatably in the forward-/backward direction of the projector unit 20. Further, the chassis 22 is provided with brackets 27 laterally protruding at both its sides, and the bracket 27 has a flange 28 formed at an outer edge and extending downwardly. Through holes 29 are formed in position on the brackets 27.

The side frames 14 of the display body 10 have bases 15 extending in an inward direction of the display body 10. A pair of guide rails 16 (only one guide rail is shown in FIG. 2) for guiding the projector unit 10 by engaging with the flange 28 are provided on the upper part of the bases 15, extending in the forward/backward direction of the display body 10. A space between an outer side surface 16c of the guide rail and the flange 28 is formed to be smaller than that between the base 15 and the chassis 22 such that the chassis 22 of the projector unit 20 does not collide with the bases 15 of the display body 10 when the projector unit 20 is received in the display body 10. A front portion of the guide rail 16 has a slant portion 16a with a thickness gradually reduced toward a distal end, and a slant portion 16b with a width gradually reduced toward an inside of the display body (see FIGS. 2 and 3). An upper surface of the guide rail has screw holes 18 which alignes with the through holes 29 formed in the bracket 27 when the projector unit 20 is received at a predetermined position in the lower cabinet 12. A thickness of the guide rail 16 is designed to allow a space to be formed between the casters 24 of the projector unit 20 and the floor surface when the rollers 26 of the projector unit 20 rotate on the upper surfaces of the guide rails 16, and to allow the projector unit 20 to be set with respect to the display body 10 at a predetermined height.

Figure 5:
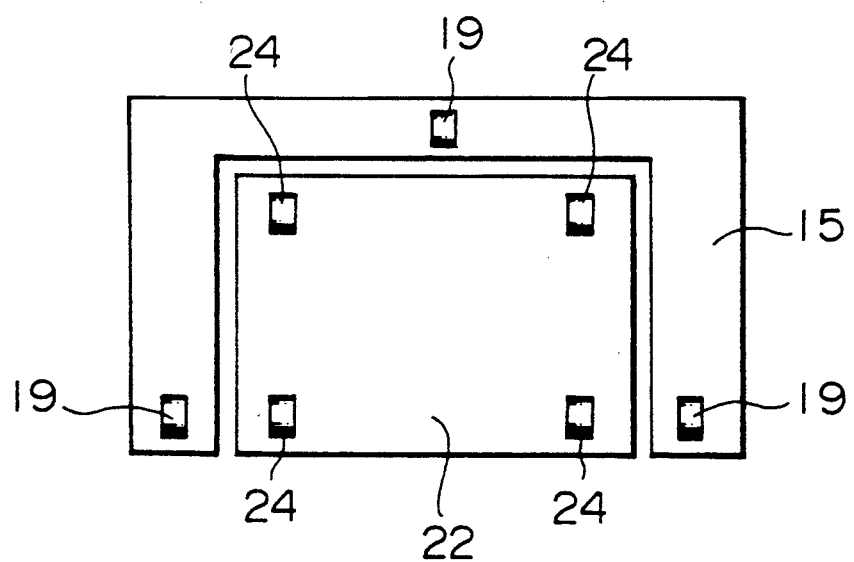
FIG. 5 is a bottom view of the first embodiment when the projector unit is received in the display body.

Further, as shown in FIG. 5, the casters 19 formed at the lower part of the display body 10 are provided at three portions taking account of the weight balance of the projection-type display device.

With the above-explained structure, when the projector unit 20 is received in the display body 10, inner sides of the flanges 28 of the brackets of the projector unit 20 will firstly engage with the slant portions 16b of the guide rails of the display body 10 and subsequently with the outer side surfaces 16c of the guide rails 16, so that the projector unit 20 is guided to a substantially predetermined position in the width direction of the display body 10. On the other hand, the rollers 26 of the projector unit 20 will engage with the slant portions 16a of the guide rails 16, rotate on the slant portions 16a and further on the upper surfaces of the guide rails 16. At this time, the projector unit 20 becomes separated from the floor surface and is supported by the display body 10. As a result, the projector unit 20 is guided to a predetermined height relative to the display body 10.

Figure 4:
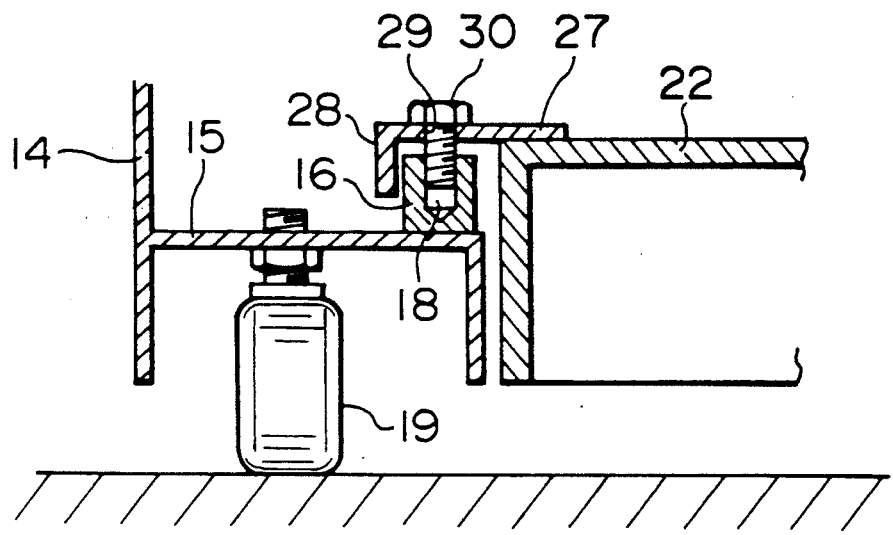
FIG. 4 is a partial cross-sectional front view taken along line IV—IV in FIG. 2 when the projector unit is received in the display body.

Next, as shown in FIG. 4, the through holes 29 formed in the brackets 27 and the screw holes 18 formed on the upper surfaces of the guide rails 16 are aligned, and bolts 30 are passed through the through holes 29 and to be screwed into the screw holes 18, so that the projector unit 20 is located at a predetermined position with respect to the display body 10. Accordingly, it is not necessary to adjust the optical relationship between the display body 10 and the projector unit 20. In addition, since the display body 10 supporting the projector unit 20 is grounded at the three points, the optical state of the projection-type display device is not affected by the change of state of the floor surface. As a result, the optical relationship need not be adjusted even when the projection-type display device is moved to another place.

A second embodiment of the projection-type display device according to the present invention will now be described with reference to FIGS. 6 and 7, particularly focusing on its difference from the aforementioned first embodiment.

A projector unit 200 is the same as the projector unit 20 in the first embodiment, except that it lacks the rollers 26.

Figure 6:
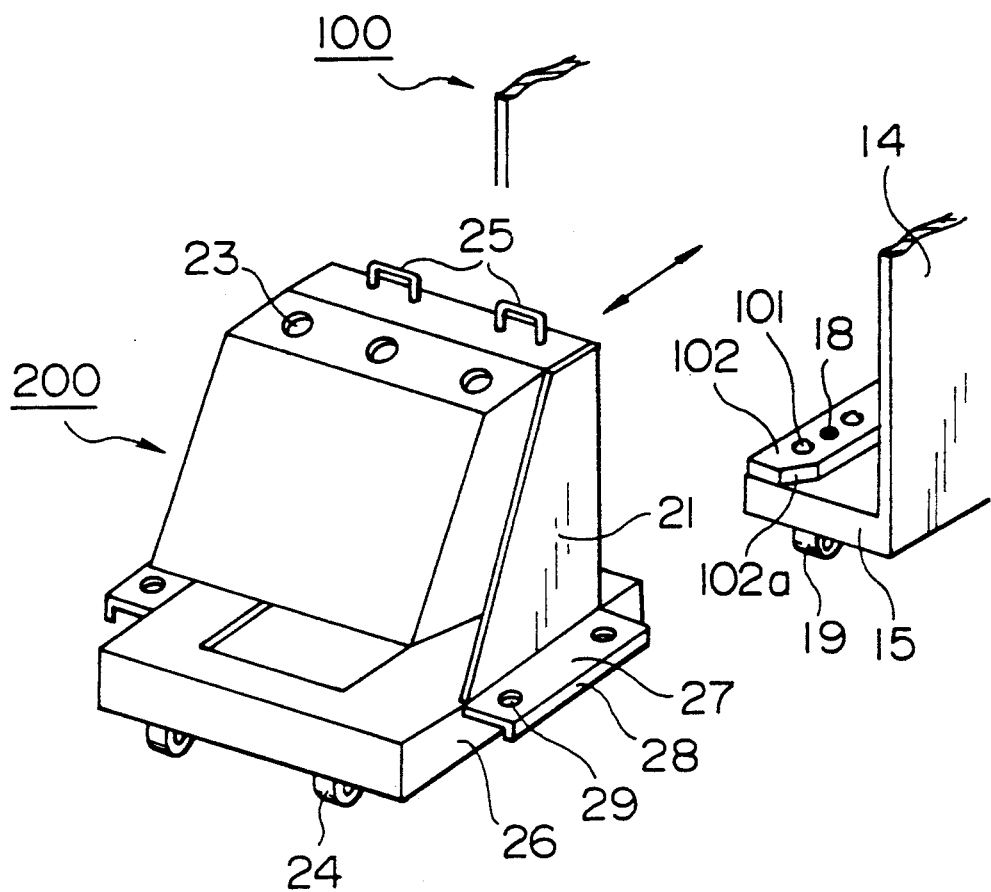
FIG. 6 is a schematic perspective view of a second embodiment of the projection-type display device according to the present invention.
Figure 7:
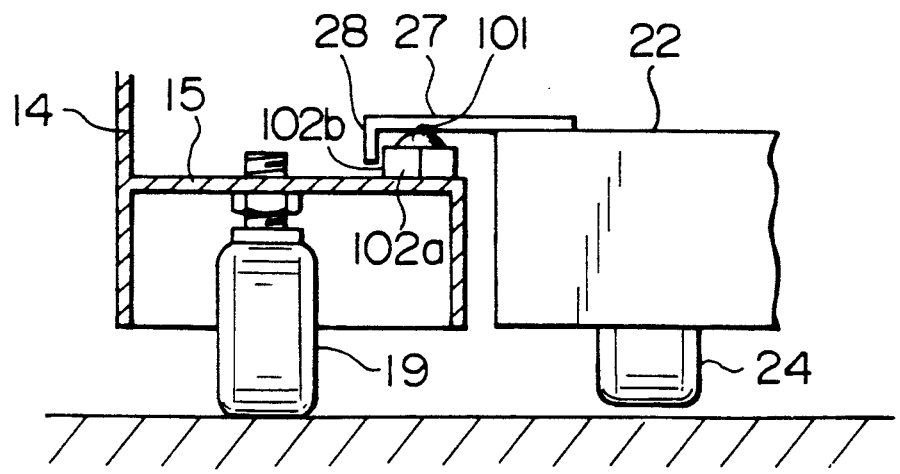
FIG. 7 is a partial front view of the second embodiment of the present invention.

In this second embodiment, the guide rails 16 of the first embodiment is replaced by a pair of ball groups 101 arranged in the forward/backward direction of the display body 10 (only one ball group is shown in FIG. 6). Balls are rotatably held on the base 15 by a perforated plate member 102. When the projector unit 200 is received in the display body 100, the brackets 27 of the projector unit 200 move on the ball groups. In this case, the height of the balls are set such that a space can be formed between the casters 24 of the projector unit 200 and the floor surface and that the projector unit 200 is set at a predetermined height with respect to the display body 100. A space between an outer side surface 102b of the perforated plate member 102 and the flange 28 is set to be smaller than that between the base 15 and the chassis 22, such that the chassis 22 of the projector unit 200 does not collide with the bases 15 of the display body 100. A front portion of the perforated plate member 102 has a slant portion 102a with the width being gradually reduced toward the inside of the display body 100. An upper surface of the perforated plate member 102 has screw holes 18 aligned with the through holes 29 formed in the bracket 27 when the projector unit 200 is received in a predetermined position with respect to the display body 100.

With the aforementioned structure, when the projector unit 200 is received in the display body 100, inner sides of the flanges 28 of the brackets 27 of the projector unit 200 engage with the slant portions 102a of the perforated plate members 102 of the display body, and thereafter with outer side surfaces 102b of the perforated plate members 102, so that the projector unit 200 is guided to a substantially predetermined position in the width direction of the display body 100. On the other hand, the lower surfaces of the brackets 27 of the projector unit 200 engage with the balls, and move on the balls. At this time, the projector unit 200 is separated from the floor surface, and is supported by the display body 100. As a result, the projector unit 200 is guided to a predetermined height with respect to the display body 100.

Next, as shown in FIG. 4, the through holes 29 formed in the brackets 29 and the screw holes 18 formed in the upper surfaces of the perforated members 102 are aligned and the bolts 30 are screwed into the screw holes 18 via the through holes 29, so that the projector unit 200 is located at a predetermined position with respect to the display body 100. Therefore, there will be no need to adjust the optical relationship between the display body and the projector unit. Further, as shown in FIG. 5, because the casters 19 mounted on the lower portion of the display body 100 are installed at the three portions taking account of the weight balance of the projection-type display device, the projection-type display device is not affected from any change in the floor surface state.

A third embodiment of the projection-type display device according to the present invention will now be described with reference to the FIGS. 8, 9 and 10, particularly focusing on its difference from the first embodiment.

In this third embodiment, the brackets 27 of the projector unit 20 of the first embodiment are replaced by plate-type brackets 401, and the rests are the same as those of the first embodiment. The bracket 401 has through holes 29 in position.

Figure 8:
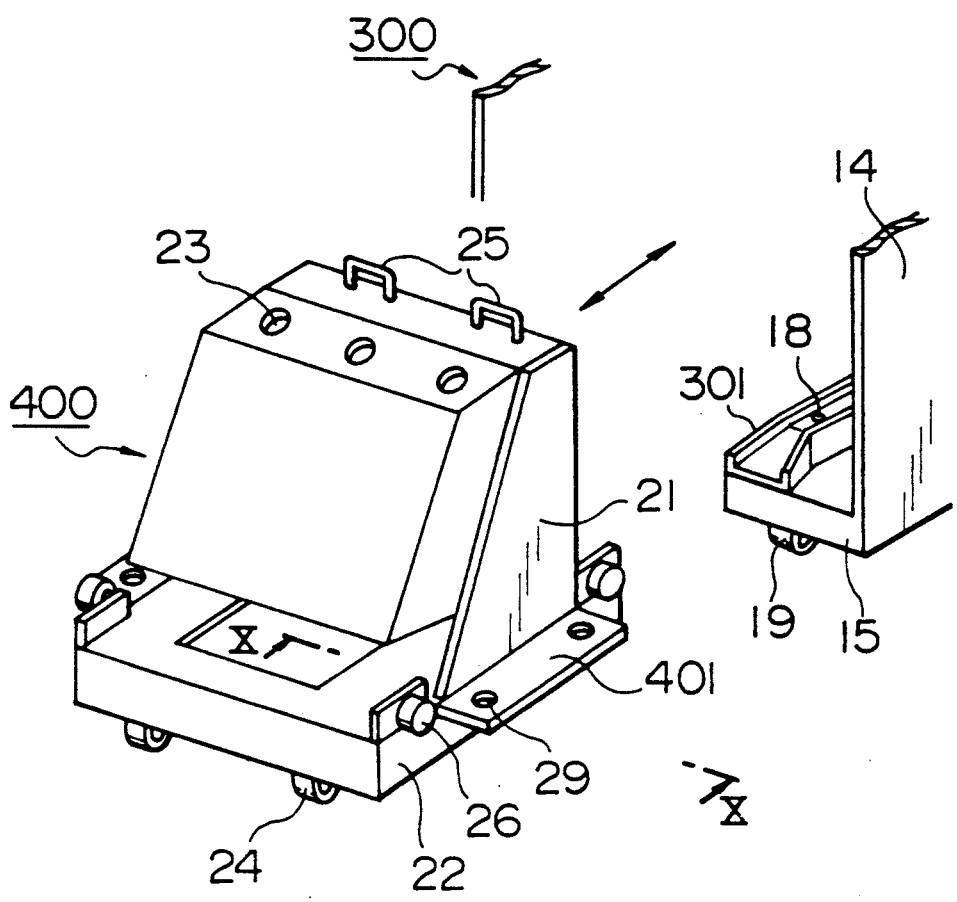
FIG. 8 is a schematic perspective view of a third embodiment of the projection-type display device according to the present invention.
Figure 9:
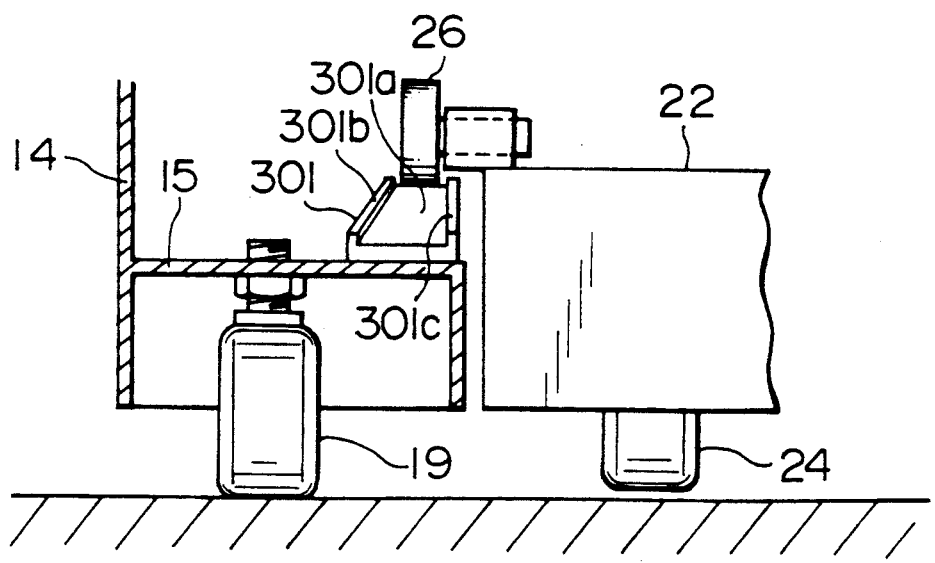
FIG. 9 is a partial front view of the third embodiment of the present invention.

Instead of the guide rails 16 in the first embodiment, a pair of flanged guide rails 301 extending in the forward/backward direction of the display body are provided (only one flanged guide rail is shown in FIG. 8). The flanged guide rail 301 has flanges 301b, 301c extending upwardly at both its sides. A space between the outer flange 301b of the flanged guide rail 301 and the rollers 26 is set to be smaller than that between the base 15 and the chassis 22 such that the chassis 22 of the projector unit 400 does not collide with the base 15 of the display body 300 when the projector unit 400 is received in the display body 300. A front portion of the flanged guide rail 301 has a slant portion 301a with a thickness being gradually smaller toward a distal end and a width being gradually wider toward the outward direction of the display body. An upper surface of the flanged guide rail 301 is formed with screw holes 18 which align with the through holes 29 formed in the bracket 401 when the projector unit 400 is received in a predetermined position in the display body 300. A thickness of the flanged guide rail 301 is set such that a space can be formed between the casters 24 of the projector unit 400 and the floor surface when the rollers 26 of the projector unit 400 rotate on the flanged guide rail 301 and that the projector unit 400 is set at a predetermined height with respect to the display body 300.

With the above structure, when the projector unit 400 is received in the display body 300, the rollers 26 of the projector unit 400 engage with the flanges 301b of the flanged guide rails 301 of the display body, so that the projector unit 400 is guided to a substantially predetermined position in the width direction of the display body 300. In addition, the rollers 26 of the projector unit 400 engage with the slant portions 301a of the flanged guide rails 301 to rotate on the slant portions 301a and further on the flanged guide rails 301. At this time, the projector unit 400 is separated from the floor surface, and supported by the display body 300. As a result, the projector unit 400 is guided to a predetermined height position with respect to the display body 300.

Figure 10:
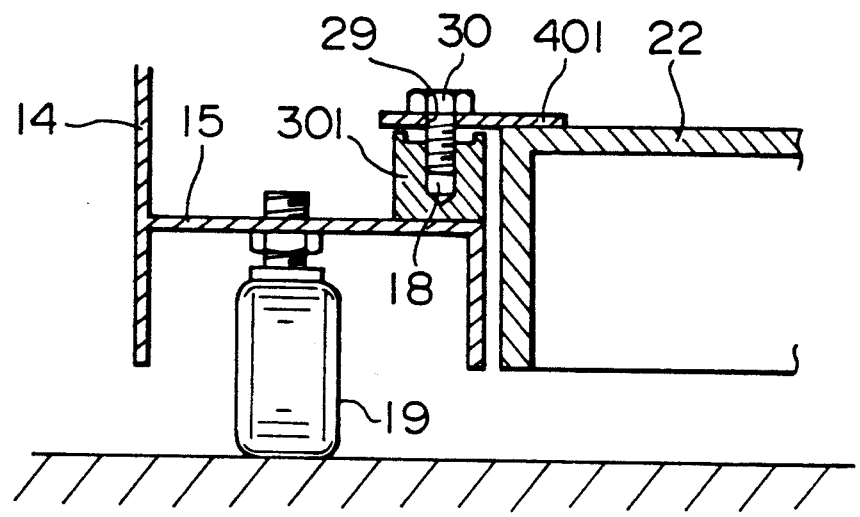
FIG. 10 is a cross-sectional front view of an essential part taken along line X—X in FIG. 8 when the projector unit is received in the display body.

Next, as shown in FIG. 10, the through holes 29 formed in the brackets 401 and the screw holes 18 formed on the upper surfaces of the flanged guide rails 301 are aligned and the bolts 30 are screwed into the screw holes 18 through the through holes 29, so that the projector unit 400 is located at a predetermined position with respect to the display body 300. Therefore, there is no need to adjust the optical relationship between the display body and the projector unit. Furthermore, as the casters 19 provided at the lower portion of the display body 300 are installed at three portions taking account of the weight balance of the projection-type display device, the projection-type display device can be stably located without receiving influence from the floor surface.

A fourth embodiment of the projection-type display device according to the present invention will now be described with reference to FIGS. 11, 10 and 13, particularly focusing on its difference from the first embodiment.

A projector unit 600 is the same as the projector unit 20 in the first embodiment except that it lacks the rollers 26.

Figure 11:
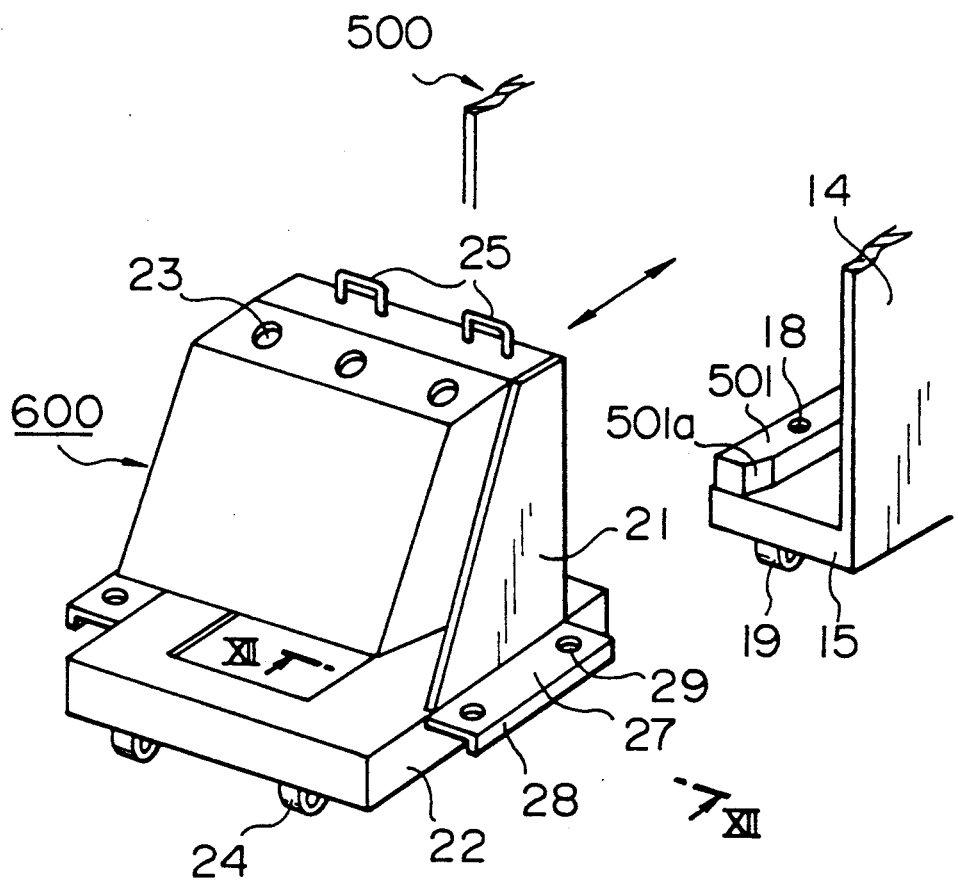
FIG. 11 is a schematic perspective view of a fourth embodiment of the projection-type display device according to the present invention.

The display body 500 is provided with a pair of guide rails 501 extending in the forward/reward direction of the display body (only one guide rail 501 is shown in FIG. 11). A space between an outer side surface 501b of the guide rail 501 and the flange 28 is set to be smaller than that between the base 15 and the chassis 22 such that the chassis 22 of the projector unit 600 does not collide with the base 15 of the display body 500 when the projector unit 600 is received. A front portion of the guide rail 501a is tapered with a slant portion having a width being gradually reduced toward the inside of the display body. On an upper surface of the guide rail 501 formed are screw holes 18 which align with the through holes 29 formed in the bracket 27 when the projector unit 600 is received in a predetermined position in the display body 500. A thickness of the guide rail 501 is set such that a space is formed between the guide rail 501 and the flange 27 of the projector unit 600 when the projector unit 600 is received in the display body 500, and that, as shown in FIG. 12, the display body 500 is located with respect to the projector unit 600 at a predetermined height when the projector unit 600 and the display body 500 are joined together.

Figure 13:
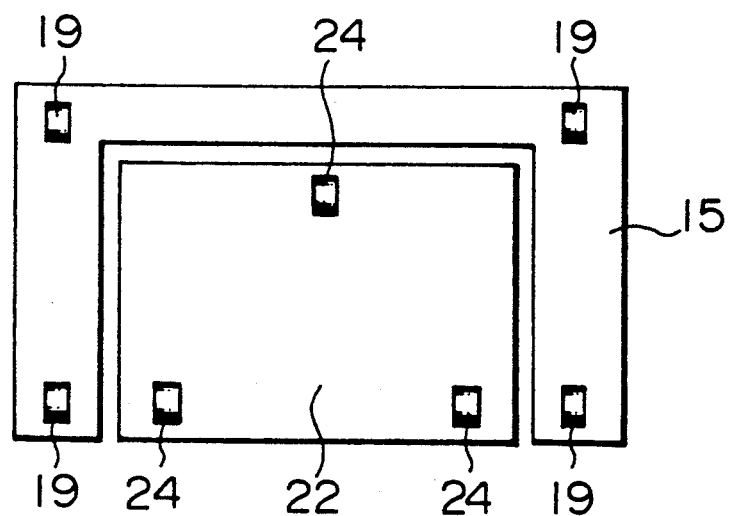
FIG. 13 is a bottom view of the fourth embodiment when the projector unit is received in the display body.

Further, the casters 24 are mounted at three portions in the lower portion of the projector unit 600 taking account of the weight balance of the projector display device as shown in FIG. 13.

With the above-mentioned structure, when the projector unit 600 is received in the display body 500, the inner sides of the flanges 28 of the brackets 27 of the projector unit 600 engage with the slant portions 501a of the guide rails 501 of the display body, and further with the outer side surfaces 501b of the guide rails 501, so that the projector unit 600 is guided at a substantially predetermined position in the width direction of the display body 500. Since there is formed the space between the guide rails 501 and the flanges 27, the projector unit 600 can be advanced into the display body 500.

Figure 12:
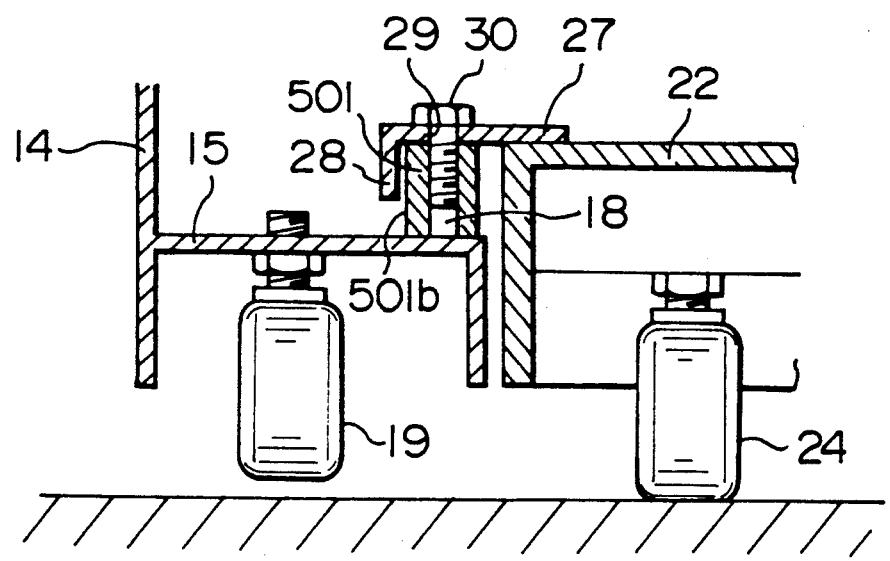
FIG. 12 is a cross-sectional front view of an essential part taken along line XII—XII in FIG. 11 when the projector unit is received in the display body.

As shown in FIG. 12, thereafter, the through holes 29 formed in the brackets 27 and the screw holes 18 formed in the upper surfaces of the guide rails 501 are aligned and the bolts 30 are screwed into the screw holes 18 through the through holes 29, so that the display body 500 is separated from the floor surface to be supported by the projector unit 600. Thus, the display body 500 is located at a predetermined position with respect to the projector unit 600. Accordingly, there is no need to adjust the optical relationship between the display body and the projector unit. In addition, as shown in FIG. 13, since the casters 24 are mounted at three portions in the lower portion of the projector 600 taking account of the weight balance of the projection-type display device, the projection-type display device is not affected from a change in the floor state.

Figure 14:
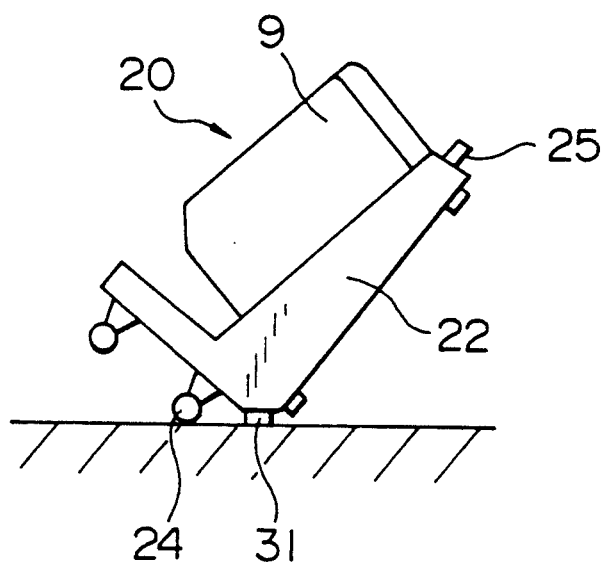
FIG. 14 is a schematic side view of the projector unit according to the present invention.

As shown in FIG. 14, the projector unit of the above-explained embodiments has a skid-proof projection such as rubber provided at position which would become the fulcrum when the projector unit is laid down or stood up. As a result, the casters are prevented from skidding when the projector unit is laid down or stood up, thereby avoiding causing damage to the people or the floor surface.

What is claimed is:

1. A projection-type display device comprising:
    a display body including an upper cabinet having a screen at a front portion thereof and a lower cabinet having a pair of side frames for supporting said upper cabinet;
    a projector unit including projectors and a mounting device on which said projectors are mounted movable in the forward/backward directions with respect to said lower cabinet;
    means for guiding said projector unit to a predetermined position in said display body when said projector unit is separated from or received into said display body;
    means for locating said projector unit at a predetermined position and securing together said projector unit and said display body to separate one of them from a floor surface; and
    means for supporting the other of said projector unit and said display body which is grounded on the floor surface, at three positions.

2. The projection-type display device according to claim 1, wherein said guiding means comprises
    a pair of plate-like guide rails extending in the forward/backward direction on the lower cabinet of said display body and having a tapered forward portion;
    a plurality of rollers rotatable on said plate-like guide rails and mounted on said projector unit at a level where said projector unit is separated from the floor surface when the rollers rotates on said plate-like guide rails;
    brackets protruding laterally from said projector unit and having flanges for guiding said projector unit by engaging with outer side surfaces of said plate-type guide rails; and
    said locating means comprises
    through holes formed at predetermined positions of said brackets;

screw holes formed at predetermined positions of said guide rails; and bolts to be passed through the through holes to be screwed into the screw holes.

3. The projection-type display device according to claim 1, wherein said guiding means comprises a pair of ball groups arranged in the forward/backward direction and rotatably supported on the lower cabinet of said display body through perforated plate members; and brackets laterally extending from said projector unit and having flanges formed at outer edges for guiding said projector unit by engaging with outer surfaces of the members; and said locating means comprises through holes formed at predetermined positions of said brackets;

screw holes formed at predetermined positions of said perforated plate members; and bolts to be passed through said through holes to be screwed into the screw holes.

4. The projection-type display device according to claim 1, wherein said guiding means comprises a pair of flanged guide rails mounted on the lower cabinet of said display body extending in the forward/backward direction, each of said guide rails having a front portion sloped in the direction of thickness and being widened toward a front end; and a plurality of rollers guided by the flanges of said flanged guide rails to rotate thereon, said rollers being rotatably installed on said projector unit at a height level where said projector unit is separated from the floor surface when said rollers rotate on said flanged guide rails; and said locating means comprises through holes formed at predetermined positions of the brackets extending laterally from said projector unit;

screw holes formed at predetermined positions of said flanged guide rails; and bolts to be passed through said through holes to be screwed into the screw holes.

5. The projection-type display device according to claim 1, wherein said guiding means comprises a pair of guide rails mounted on the lower cabinet of said display body extending in the forward/backward direction; and brackets extending laterally from said projector unit and having flanges formed at outer edges for guiding said projector unit by engaging with outer side surfaces of said guide rails; and said locating means comprises through holes formed at predetermined positions of said brackets;

screw holes formed at predetermined positions of said guide rails; and bolts to be passed through said through holes to be screwed into said screw holes;

whereby said display body is separated from the floor surface when said display body and said projector unit are joined together.

6. The projection-type display device according to claim 1, wherein said projector unit has means for preventing skid disposed at a fulcrum position for said projector unit when said projector unit is laid down and stood up.

* * * * *